(12) United States Patent
Shin et al.

(10) Patent No.: US 12,452,510 B2
(45) Date of Patent: Oct. 21, 2025

(54) CAMERA MODULE AND OPTICAL DEVICE COMPRISING SAME

(71) Applicant: LG INNOTEK CO., LTD., Seoul (KR)

(72) Inventors: Won Seob Shin, Seoul (KR); Tae Young Kim, Seoul (KR); Woong Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 239 days.

(21) Appl. No.: 18/023,163

(22) PCT Filed: Aug. 26, 2021

(86) PCT No.: PCT/KR2021/011455
§ 371 (c)(1),
(2) Date: Feb. 24, 2023

(87) PCT Pub. No.: WO2022/045801
PCT Pub. Date: Mar. 3, 2022

(65) Prior Publication Data
US 2023/0319382 A1 Oct. 5, 2023

(30) Foreign Application Priority Data
Aug. 26, 2020 (KR) ........................ 10-2020-0107758

(51) Int. Cl.
*H04N 23/54* (2023.01)
*G03B 30/00* (2021.01)

(52) U.S. Cl.
CPC ............. *H04N 23/54* (2023.01); *G03B 30/00* (2021.01)

(58) Field of Classification Search
CPC ........ H04N 23/54; H04N 23/55; H04N 23/51; H04N 23/57; G03B 30/00; G03B 2205/0069; G03B 3/00; G03B 2205/0007; H01L 27/14618; H01L 27/14609
See application file for complete search history.

(56) References Cited

U.S. PATENT DOCUMENTS

| | | | |
|---|---|---|---|
| 10,277,791 | B2 | 4/2019 | Ha et al. |
| 10,652,446 | B2 | 5/2020 | Ha et al. |
| 11,509,805 | B2 | 11/2022 | Ha et al. |
| 2014/0267760 | A1 | 9/2014 | Lee et al. |
| 2017/0214831 | A1 | 7/2017 | Ha et al. |

(Continued)

FOREIGN PATENT DOCUMENTS

| | | |
|---|---|---|
| CN | 106817515 A | 6/2017 |
| CN | 106998415 A | 8/2017 |

(Continued)

*Primary Examiner* — Nhan T Tran
(74) *Attorney, Agent, or Firm* — Birch, Stewart, Kolasch & Birch, LLP

(57) ABSTRACT

A camera module according to an embodiment includes a circuit board; a protrusion disposed on the circuit board; an adhesive member disposed on the circuit board and including an opening vertically overlapping the protrusion; and a sensor base disposed on the adhesive member and including a concave portion vertically overlapping the protrusion, wherein the protrusion is inserted into the concave portion of the sensor base, and wherein the adhesive member has a closed loop shape surrounding an edge region of an upper surface of the circuit board.

16 Claims, 8 Drawing Sheets

(56) References Cited

U.S. PATENT DOCUMENTS

| | | | |
|---|---|---|---|
| 2019/0137724 A1* | 5/2019 | Kim | ........................ G02B 7/02 |
| 2019/0215425 A1 | 7/2019 | Ha et al. | |
| 2019/0320095 A1* | 10/2019 | Kim | ...................... H04N 23/55 |
| 2020/0236263 A1 | 7/2020 | Ha et al. | |
| 2021/0041534 A1 | 2/2021 | Egawa | |

FOREIGN PATENT DOCUMENTS

| | | |
|---|---|---|
| JP | 2006-106716 A | 4/2006 |
| KR | 10-2012-0063237 A | 6/2012 |
| KR | 10-2014-0109756 A | 9/2014 |
| KR | 10-2014-0112874 A | 9/2014 |
| KR | 10-2015-0051744 A | 5/2015 |
| KR | 10-2018-0092726 A | 8/2018 |
| KR | 10-2020-0032429 A | 3/2020 |
| WO | WO 2019/150943 A1 | 8/2019 |

* cited by examiner

[FIG. 1]
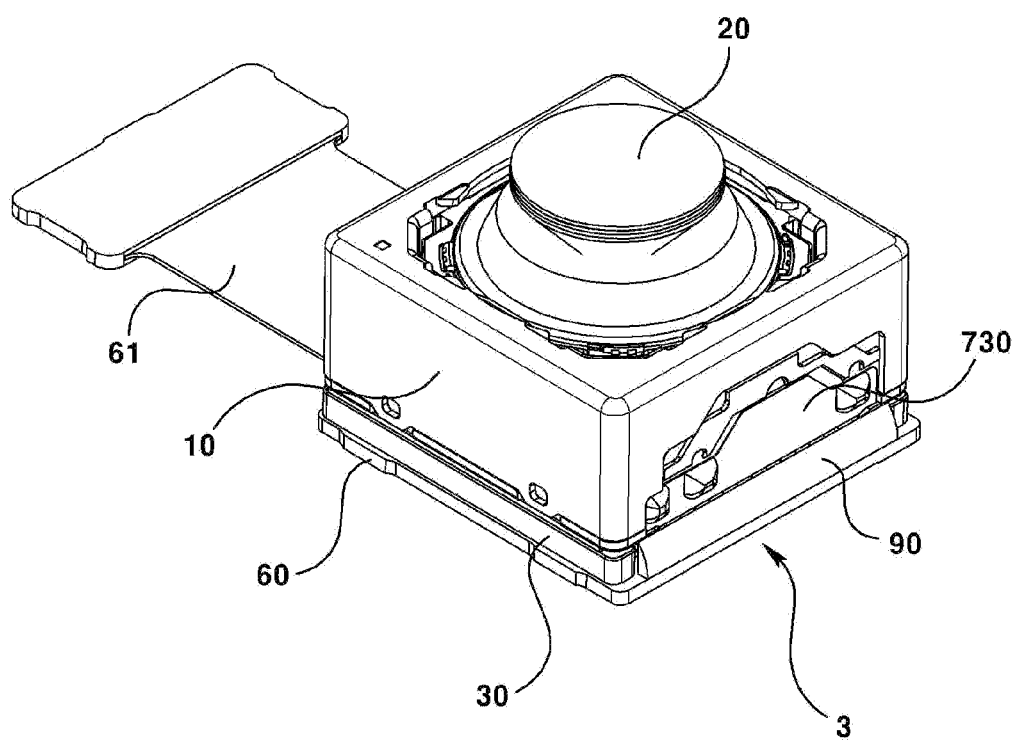

[FIG. 2]
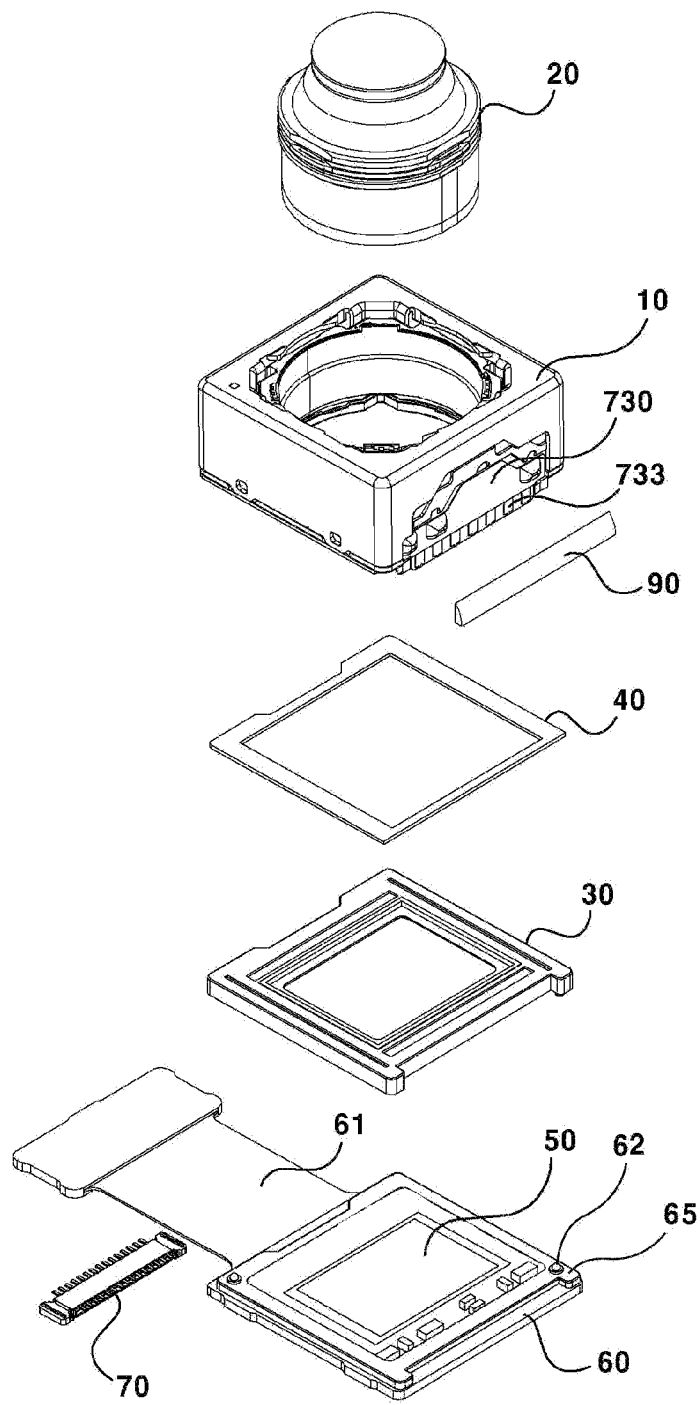

[FIG. 3]
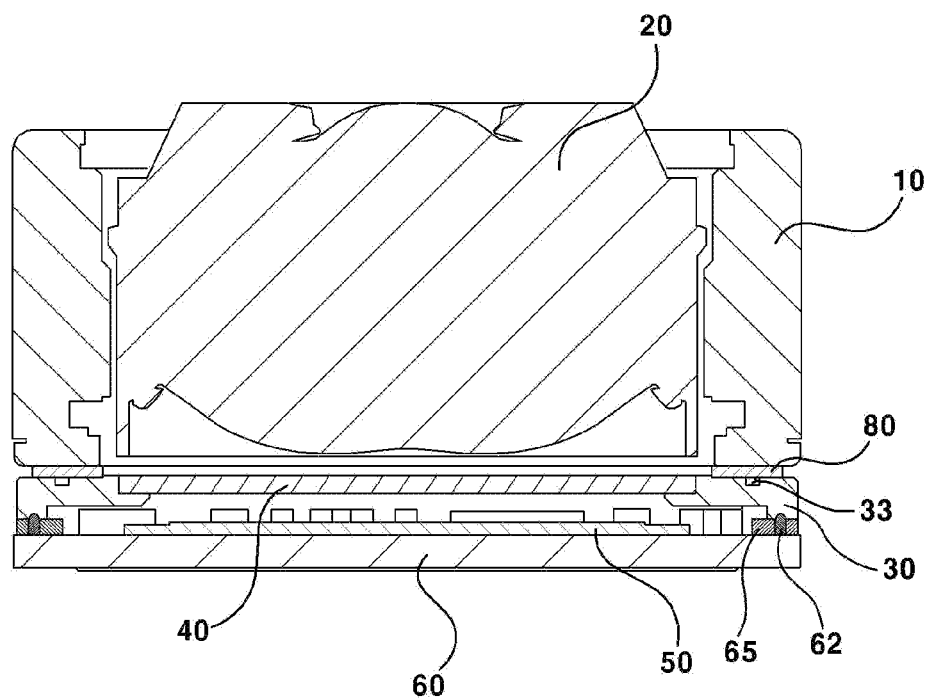

[FIG. 4]
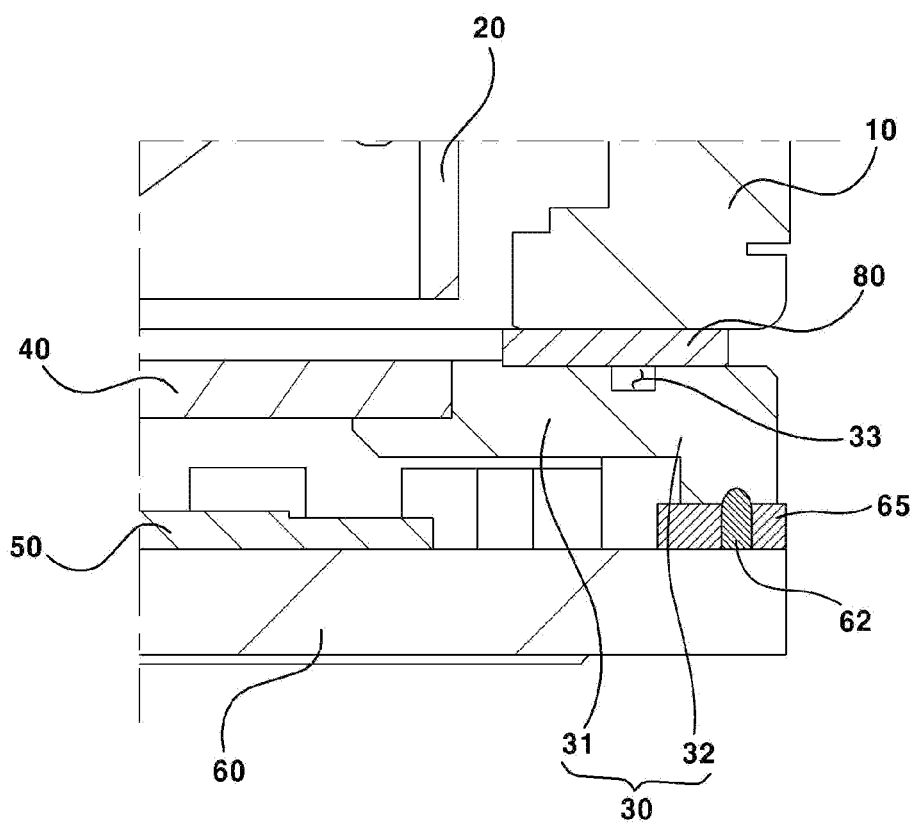

[FIG. 5]
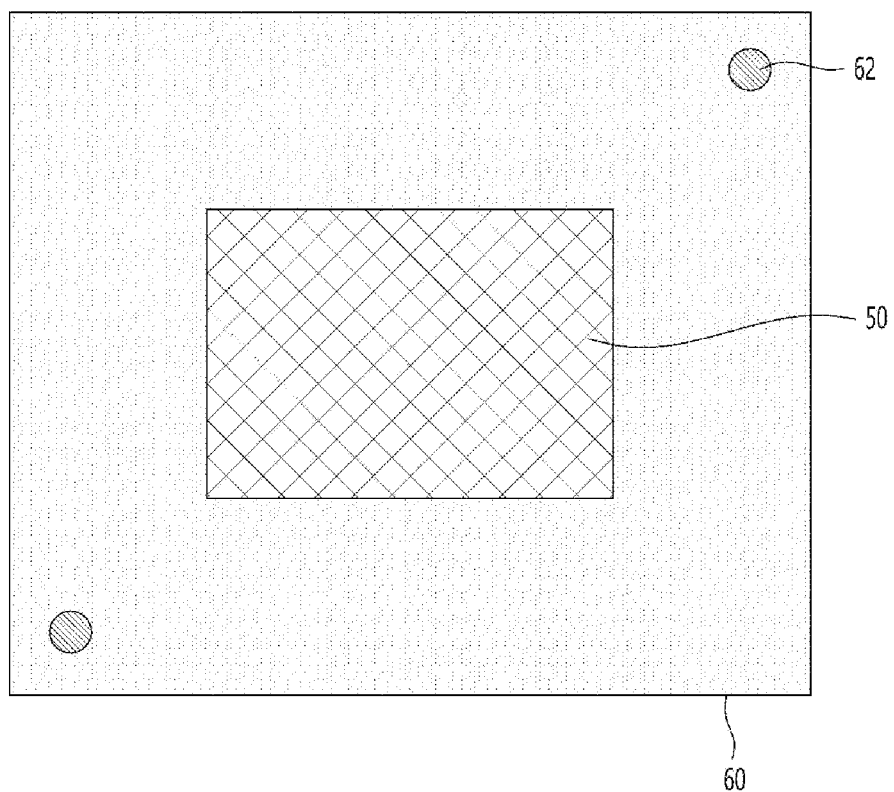

[FIG. 6]
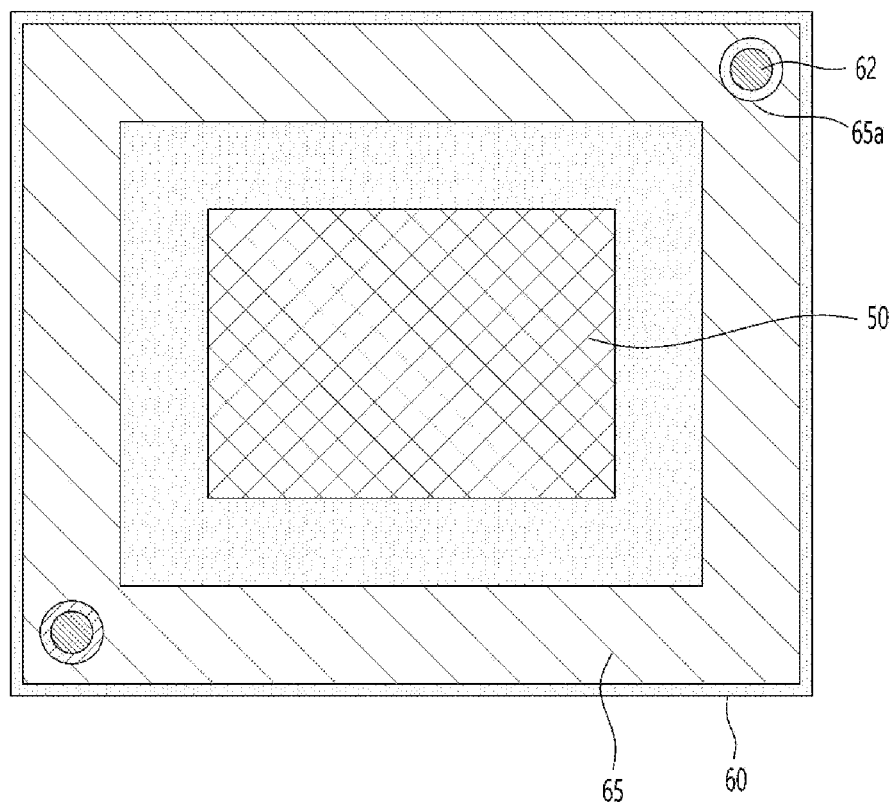
[FIG. 7]
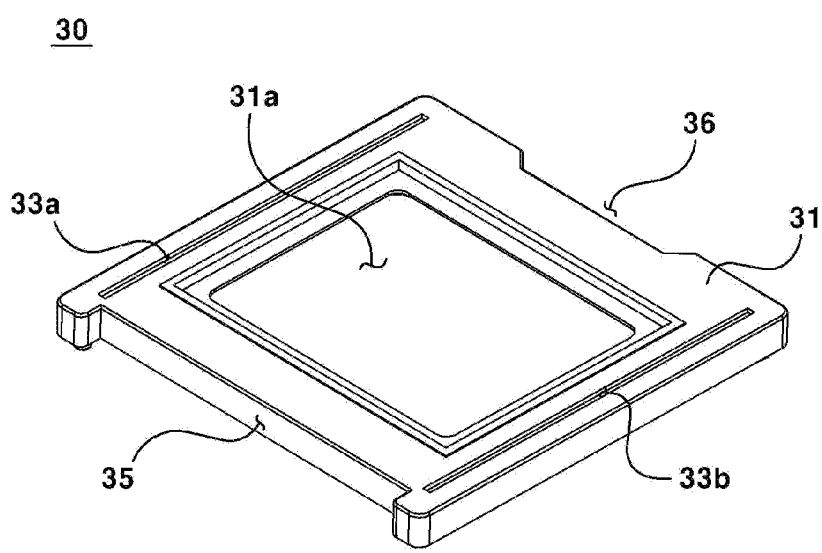

[FIG. 8]
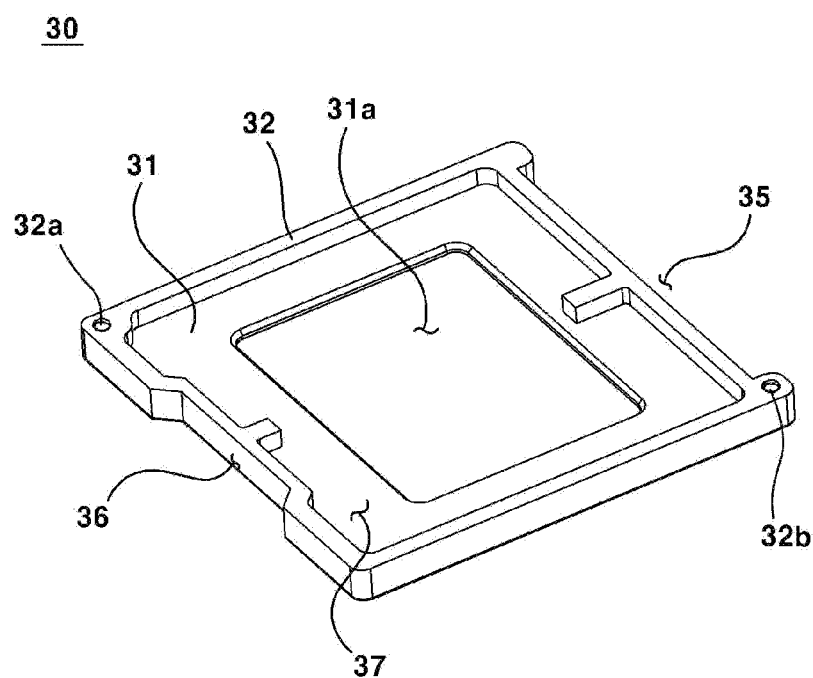
[FIG. 9]
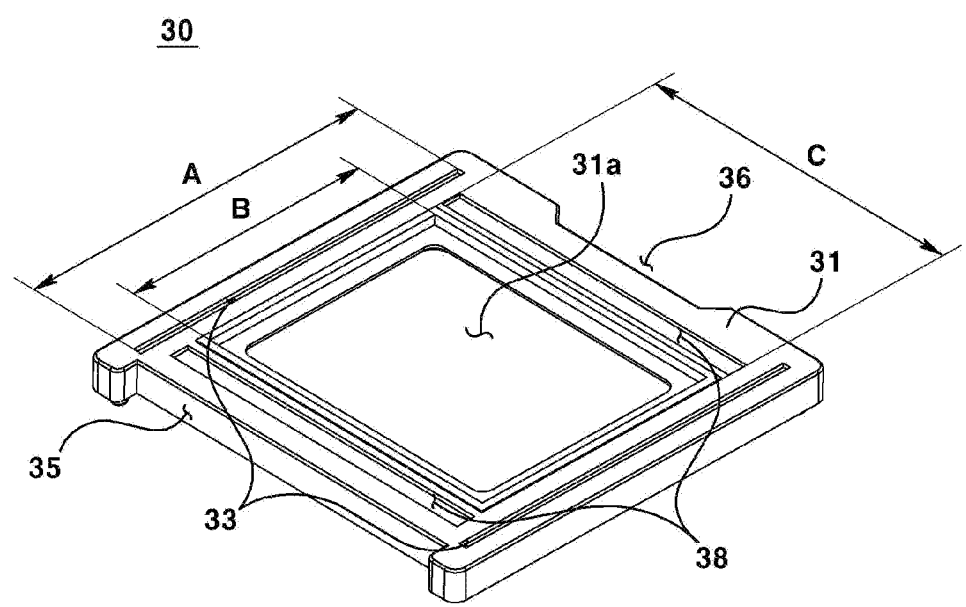

【FIG. 10】
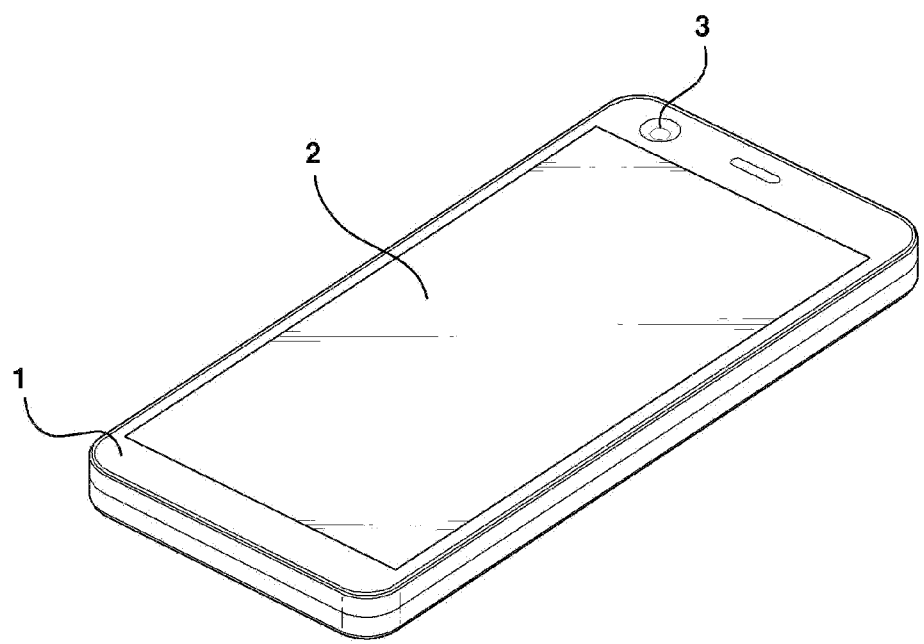

CAMERA MODULE AND OPTICAL DEVICE COMPRISING SAME

CROSS REFERENCE TO RELATED APPLICATIONS

This application is the National Phase of PCT/KR2021/011455 filed on Aug. 26, 2021, which claims priority under 35 U.S.C. § 119(a) to Patent Application No. 10-2020-0107758 filed in the Republic of Korea on Aug. 26, 2020, all of which are hereby expressly incorporated by reference into the present application.

TECHNICAL FIELD

An embodiment relates to a camera module and an optical device comprising the same.

BACKGROUND ART

A spread of various portable terminals is widely generalized, wireless internet service is commercialized, and accordingly, consumers' demands related to portable terminals are also diversifying, and various types of additional devices are being installed in portable terminals.

As a representative example, there is a camera module that takes a picture or video of a subject.

Recently, the diameter of a lens and a lens barrel tends to increase as high-performance lens performance is required in a camera module.

In addition, a sensor base also tends to increase correspondingly, as the lens and lens barrel become larger. The sensor base is disposed between a lens driving device and a circuit board, and thus includes a seating part on which a filter is disposed.

On the other hand, there is a tendency to remove a support part such as protrusions formed on the sensor base due to various recent issues. Accordingly, the sensor base and the circuit board may be coupled by using an adhesive such as epoxy.

However, if the sensor base does not include the support part, the sensor base is shifted in up, down, left and right directions as the pressing jig is used when the adhesive member is cured. In addition, when the sensor base shifts, a black masking region of an infrared filter disposed on the sensor base covers an active pixel region of the image sensor, which is a factor that causes various optical problems such as blinding and overlapping.

Accordingly, recently, when attaching a sensor base that does not include a support part, the pressing jig is not used in order to solve the above problem However, when the pressing jig is not used, it is difficult to secure an active alignment between the sensor base and the lens driving device, and the filter is damaged due to contact with the lens module during a drop test, a tumble test, and a residual impact reliability test because a height is not managed.

In addition, there is a problem in that the sensor base is separated from the circuit board as the adhesive member is not cured while the sensor base is pressed on the adhesive member.

DISCLOSURE

Technical Problem

An embodiment provides a camera module capable of increasing coupling force between a circuit board and a sensor base and an optical device including the same.

In addition, the embodiment provides a camera module capable of increasing alignment between a circuit board and a sensor base and an optical device including the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A camera module according to an embodiment comprises a circuit board; a protrusion disposed on the circuit board; an adhesive member disposed on the circuit board and including an opening vertically overlapping the protrusion; and a sensor base disposed on the adhesive member and including a concave portion vertically overlapping the protrusion, wherein the protrusion is inserted into the concave portion of the sensor base, and wherein the adhesive member has a closed loop shape surrounding an edge region of an upper surface of the circuit board.

In addition, the protrusion includes a solder ball.

In addition, the concave portion includes a concaved recess concave from a lower surface of the sensor base toward an upper surface of the sensor base.

In addition, the protrusion includes: a first protrusion disposed in a first corner region of the upper surface of the circuit board, and a second protrusion disposed in a second corner region of the upper surface of the circuit board located in a direction diagonal to the first corner region.

In addition, the concave portion includes a first concave portion provided in a region vertically overlapped with the first protrusion on the lower surface of the sensor base; a second concave portion provided in a region vertically overlapping with the second protrusion on the lower surface of the sensor base.

In addition, the adhesive member is disposed surrounding an outer surface of the protrusion inserted into the opening.

In addition, an upper surface of the protrusion is positioned higher than an upper surface of the adhesive member.

In addition, a lower surface of the sensor base is positioned lower than an upper surface of the protrusion.

In addition, the camera module further comprises an image sensor disposed on the circuit board; and wherein the adhesive member does not overlap vertically with the image sensor and is disposed surrounding the image sensor.

On the other hand, an optical device according to the embodiment comprises A body, a camera module disposed on the body and capturing an image of a subject, and a display unit disposed on the body and outputting the image captured by the camera module, wherein the camera module comprises: a circuit board; a protrusion disposed on the circuit board; an adhesive member disposed on the circuit board and including an opening vertically overlapping the protrusion; and a sensor base disposed on the adhesive member and including a concave portion vertically overlapping the protrusion, wherein the protrusion is inserted into the concave portion of the sensor base, and wherein the adhesive member has a closed loop shape surrounding an edge region of an upper surface of the circuit board.

Effects of the Invention

The embodiment allows a solder ball to be fitted into a concaved recess when attaching a sensor base by disposing the solder ball on an upper surface of a circuit board and providing a concaved recess on a lower surface of the sensor base. According to this embodiment, when attaching the sensor base to the circuit board, even if a pressing jig is used, a positional displacement problem of the sensor base can be solved by the solder ball, and reliability can be improved by preventing an active region of the image sensor from being covered by a black masking of the filter.

In addition, when coupling the sensor base, the embodiment can improve a coupling force of the sensor base by being able to use the pressing jig, and accordingly, it is possible to secure a constant Bont Level Thickness (BLT) height.

In addition, the embodiment surrounds a region where the sensor base is to be disposed through the adhesive member, so that the camera module can be cleaned in a state where the sensor base is coupled. Specifically, when the camera module is cleaned in a state where the adhesive member is not disposed, moisture or water penetrates into the sensor base, causing wet defects. In contrast, the embodiment can block the penetration of the moisture or water through the adhesive member, thereby solving the wet defect.

DESCRIPTION OF DRAWINGS

FIG. 1 is a perspective view of a camera module according to an embodiment.

FIG. 2 is an exploded perspective view of a camera module according to an embodiment.

FIG. 3 is a cross-sectional view of a camera module according to an embodiment.

FIG. 4 is a partially enlarged cross-sectional view of a part of FIG. 3 enlarged.

FIG. 5 is a plan view of a circuit board viewed from above according to an embodiment.

FIG. 6 is a plan view of a state in which an adhesive member is coupled to the circuit board of FIG. 5.

FIG. 7 is a perspective view of a sensor base of a camera module according to an embodiment.

FIG. 8 is a bottom perspective view of a sensor base of a camera module according to an embodiment.

FIG. 9 is a perspective view of a sensor base of a camera module according to a modified example of an embodiment.

FIG. 10 is a perspective view of an optical device according to an embodiment.

BEST MODE

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. Further, the terms used in the embodiments of the present invention are for describing the embodiments and are not intended to limit the present invention.

In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (A, and (b) may be used.

These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

An optical axis direction used below is defined as an optical axis direction of a camera actuator and a lens coupled to a camera module, and a vertical direction may be defined as a direction perpendicular to the optical axis.

"Auto focus function" used below is defined as a function for automatically adjusting a focus on a subject by adjusting a distance from an image sensor and moving a lens in the optical axis direction according to the distance of the subject so that a clear image of the subject may be obtained on the image sensor. Meanwhile, 'auto focus' may be used interchangeably with 'AF'.

"hand shake correction function" used below is defined as a function of moving or tilting a lens module in a direction perpendicular to the optical axis direction to offset vibration (movement) generated in the image sensor by an external force. Meanwhile, 'hand shake correction' may be used interchangeably with 'OIS (Optical Image Stabilization)'.

Hereinafter, 'lens driving device' may be used interchangeably with 'voice coil motor (VCM)'.

Hereinafter, the configuration of the camera module according to the present embodiment will be described with reference to the drawings.

FIG. 1 is a perspective view of a camera module according to an embodiment, FIG. 2 is an exploded perspective view of a camera module according to an embodiment, FIG. 3 is a cross-sectional view of a camera module according to an embodiment, FIG. 4 is a partially enlarged cross-sectional view of a part of FIG. 3 enlarged, FIG. 5 is a plan view of a circuit board viewed from above according to an embodiment, FIG. 6 is a plan view of a state in which an adhesive member is coupled to the circuit board of FIG. 5, FIG. 7 is a perspective view of a sensor base of a camera module according to an embodiment, and FIG. 8 is a bottom perspective view of a sensor base of a camera module according to an embodiment.

A camera module may include a lens driving device 10, a lens module 20, a sensor base 30, a filter 40, an image sensor 50, a circuit board 60, a connector 70, an adhesive 80, and a protective member 90 and a controller (not shown). However, in the camera module, any one or more of the lens driving device 10, the lens module 20, the sensor base 30, the filter 40, the image sensor 50, the circuit board 60, the connector 70, and the adhesive 80, the protective member 90 and the controller may be omitted or changed.

Meanwhile, an adhesive member 65 is disposed between the sensor base 30 and the circuit board 60. The adhesive member may provide adhesive force between the sensor base 30 and the circuit board 60. Accordingly, the sensor base 30 can be firmly coupled to the circuit board 60. In this case, the adhesive member 65 may be formed on the circuit board 60 to have a closed loop shape. Meanwhile, a protrusion 62 is formed on the circuit board 60. The protrusion 62 may be, for example, a solder ball. Hereinafter, the protrusion will be described as a solder ball.

The solder ball 62 may be formed in a corner region of the circuit board 60. Specifically, a plurality of solder balls 62 may be formed on the circuit board 60. For example, the solder balls 62 may include a plurality of solder balls each formed at a plurality of corner regions of the circuit board 60. That is, the solder balls 62 may be respectively formed in two corner regions located in opposite directions among corner regions of the circuit board 60. The solder ball 62 may overlap the sensor base 30 in the optical axis direction. That is, the solder ball 62 may be formed in a region where the sensor base 30 is to be disposed among corner regions of the circuit board 60.

In addition, the adhesive member 65 may be formed in a region where the sensor base 30 is to be disposed on an upper surface of the circuit board 60.

The adhesive member 65 may have an opening for opening the solder ball 62 disposed on the upper surface of the circuit board 60. In addition, the solder ball 62 may be exposed through the opening of the adhesive member 65. Specifically, the solder ball 62 may protrude above the upper surface of the adhesive member 65. For example, an upper surface of the solder ball 62 may be positioned higher than an upper surface of the adhesive member 65. The solder ball 62 is inserted into the opening of the adhesive member 65, so that at least a part of the outer surface may be surrounded by the adhesive member 65. This will be described in more detail below.

Before explaining the configuration of the present invention, an active alignment type module is mounted on the sensor base through a process of applying epoxy to the upper surface of the sensor base 30 after assembling the image sensor 50, the circuit board 60, and the sensor base 30, and a process of Active Aligning (Auto Focusing) the assembly of the lens driving device 10 and the lens module 20

As a recent trend requires high-performance lens performance, a diameter of the lens module 20 is increasing. However, the diameter of the lens module 20 increases in a state where the size of the relatively compact lens driving device 10 is limited, so that an adhesion area between the sensor base 30 and the lens driving device 10 is reduced.

Correspondingly, an adhesion area between the circuit board 60 and the sensor base 30 is also reduced. Accordingly, when the sensor base 30 is attached on the circuit board 60 without using a pressing jig, an adhesion force of the sensor base 30 is reduced. In this embodiment, an epoxy is applied to the upper surface of the sensor base 30 after assembling the image sensor 50, the printed circuit board 10, and the sensor base 30. In this case, an active align epoxy must be applied to a dent structure. Thereafter, a module may be completed after mounting the lens driving device 10 through active alignment.

This embodiment is characterized in that a dent structure is applied to an upper surface of the sensor base 30. In this embodiment, as the dent structure is applied to the active align epoxy-coated surface, the epoxy flows into a dent portion, and the adhesive strength of the active align epoxy may be increased by increasing the adhesion area with the lens driving device 10. In this case, separation of the lens driving device 10 after the drop and tumble test may be prevented due to the increase in adhesive strength. In addition, when the dent structure is not applied, an external epoxy additional sealing process of the lens driving device 10 applied as a method to prevent separation of the lens driving device 10 may be omitted. Furthermore, a phenomenon in which active align epoxy is introduced into the filter 40 due to excessive application can be prevented.

That is, the embodiment increases the coupling force between the sensor base 30 and the circuit board 60 by changing the coupling structure of the sensor base 30 and the circuit board 60 and the coupling structure of the sensor base 30 and the lens driving device 10, and accordingly, reliability can be improved.

The lens driving device 10 may be coupled to the sensor base 30. The lens driving device 10 may be disposed on an upper surface of the sensor base 30. The lens driving device 10 may include a substrate 730 disposed on a side surface of the lens driving device 10. The lens driving device 10 may be coupled to the lens module 20. The lens driving device 10 may move the coupled lens module 20.

The lens module 20 may include at least one lens. The lens module 20 may include a lens and a lens barrel.

The lens module 20 may include a lens barrel and at least one lens accommodated in the lens barrel. However, one configuration of the lens module 20 is not limited to the lens barrel, and any holder structure capable of supporting one or more lenses may be used. The lens module 20 may be coupled to the inside of the lens driving device 10. The lens module 20 may be coupled to the bobbin 210 of the lens driving device 10. The lens module 20 may move integrally with the bobbin 210. The lens module 20 may be coupled to the bobbin 210 by an adhesive (not shown). For example, the lens module 20 may be screwed to the bobbin 210. Meanwhile, light passing through the lens module 20 may be irradiated to the image sensor 50.

The sensor base 30 may be disposed on an upper surface of the circuit board 60. The sensor base 30 may be disposed below the lens driving device 10. The sensor base 30 may be disposed between the circuit board 60 and the lens driving device 10. The sensor base 30 may accommodate the image sensor 50 therein. The sensor base 30 may be formed of an injection-molded material. The sensor base 30 may be formed of an insulating material.

The sensor base 30 may include a body part 31 and a support part 32. However, any one or more of the body part 31 and the support part 32 in the sensor base 30 may be omitted or changed. The sensor base 30 may include a body part 31 having a through hole 31a disposed above the image sensor 50. The sensor base 30 may include a support part 32 extending downward from an outer circumference of the body part 31 and disposed on the upper surface of the circuit board 60.

The body part 31 may be disposed above the image sensor 50. A through hole 31a may be formed in the body part 31. A support part 32 may be formed on the outer circumference of the body part 31. A lens driving device 10 may be disposed on an upper surface of the body part 31.

The support part 32 may extend downward from the outer circumference of the body part 31. The support part 32 may be disposed on the upper surface of the circuit board 60. Preferably, an adhesive member 65 may be disposed between the support part 32 of the sensor base 30 and the upper surface of the circuit board 60. In addition, the support part 32 of the sensor base 30 may be attached to the upper surface of the circuit board 60 through the adhesive member 65.

The support part 32 may support the body part 31 with respect to the circuit board 60. Through this, the body part 31 may be spaced apart from the upper surface of the circuit board 60 and the image sensor 50.

Meanwhile, a concave portion may be formed in the support part 32. As an example of the concave portion, it may be a concaved recess concave in a direction from a lower surface of the support part to an upper surface of the support part. Hereinafter, the concave portion will be described as a concaved recess.

A plurality of first concaved recesses 32a and 32b may be formed on the lower surface of the support part 32.

That is, a plurality of first concaved recesses 32a and 32b may be formed on the lower surface of the sensor base 30. For example, the first concaved recesses 32a and 32b may be formed on each of two corner regions of the lower surface of the sensor base 30 located in opposite directions.

The first concaved recesses 32a and 32b may be recessed inward from the lower surface of the support part 32. The first concaved recesses 32a and 32b may be formed to guide coupling with the circuit board 60. That is, the first concaved recesses 32a and 32b may correspond to the solder balls 62 formed on the circuit board 60.

Specifically, the first concaved recesses 32a and 32b may have shapes and sizes corresponding to the solder balls 62 formed on the circuit board 60. That is, when the sensor base 30 is coupled to the circuit board 60, the solder balls 62 disposed on the upper surface of the circuit board 60 may be inserted into the first concaved recesses 32a and 32b of the sensor base 30. In addition, a third concave portion 37 may be provided concavely on the lower surface of the sensor base 30 by the support part 32.

The sensor base 30 may include a second concaved recess 33 provided concavely on the upper surface of the sensor base 30 and accommodating at least a part of the adhesive 80.

The second concaved recess 33 may be recessed on the upper surface of the sensor base 30. The second concaved recess 33 may accommodate at least a part of the adhesive 80 used for attachment to the sensor driving device. The adhesive 80 may be applied along the second concaved recess 33. The second concaved recess 33 may be formed spaced apart from a filter accommodating part 34. The second concaved recess 33 may be recessed with a depth of 0.05 mm from the upper surface of the sensor base 30. The second concaved recess 33 may be concave with a depth of 0.03 to 0.05 mm from the upper surface of the sensor base 30. The second concaved recess 33 may be formed to have a width of 0.2 mm. The second concaved recess 33 may have a width of 0.2 to 0.3 mm.

The second concaved recess 33 may include a first recess 33a and a second recess 33b. The second concaved recess 33 may include a first recess 33a and a second recess 33b formed between the filter accommodating part 34 and an outer side surface of the sensor base 30 and spaced apart from each other.

The first recess 33a and the second recess 33b may be formed between the filter accommodating part 34 and the outer side surface of the sensor base 30. The first recess 33a and the second recess 33b may be spaced apart from each other. The first recess 33a may be disposed parallel to the second recess 33b on the opposite side of the second recess 33b based on the filter accommodating part 34. The first recess 33a and the second recess 33b may be spaced apart from the outer side surface of the sensor base 30. Each of the first recess 33a and the second recess 33b may straightly extend along an imaginary straight line. Extension lengths of the first recess 33a and the second recess 33b may be longer than a length in a direction corresponding to the filter accommodating part 34.

The first recess 33a may be formed between the filter accommodating part 34 and the outer side surface of the sensor base 30. The first recess 33a may be spaced apart from the second recess 33b. The first recess 33a may be spaced apart from the outer side surface of the sensor base 30. A distance between the first recess 33a and the outer side surface of the sensor base 30 may correspond to a distance between the first recess 33a and the filter accommodating part 34. The first recess 33a may straightly extend along an imaginary straight line. The extension length of the first recess 33a (see A in FIG. 9) may be longer than the length in a direction corresponding to the filter accommodating part 34 (see B in FIG. 9).

The second recess 33b may be formed between the filter accommodating part 34 and the outer side surface of the sensor base 30. The second recess 33b may be spaced apart from the first recess 33a. The second recess 33b may be spaced apart from the outer side surface of the sensor base 30. A distance between the second recess 33b and the outer side surface of the sensor base 30 may correspond to a distance between the second recess 33b and the filter accommodating part 34. The second recess 33b may straightly extend along an imaginary straight line. The extension length of the second recess 33b (see A in FIG. 9) may be longer than the length in a direction corresponding to the filter accommodating part 34 (see B in FIG. 9).

Alternatively, the second concaved recess 33 may not extend in a straight line but in a zigzag pattern. In addition, the second concaved recess 33 may be extended to have a curvature. A plurality of second concaved recesses 33 may be spaced apart and arranged in a line. A plurality of second concaved recesses 33 may be arranged in parallel with respect to the upper surface of the sensor base 30 in an oblique direction.

Alternatively, the second concaved recess 33 may be formed on the lower surface of the lens driving device 10 instead of the upper surface of the sensor base 30. Alternatively, the second concaved recess 33 may be formed on the upper surface of the sensor base 30 and the lower surface of the lens driving device 10, respectively. In this case, the second concaved recess 33 of the sensor base 30 and the second concaved recess 33 of the lens driving device 10 may be formed in a shape corresponding to a corresponding position.

The sensor base 30 may include a through hole 31a formed at a position corresponding to the image sensor 50. The sensor base 30 may include a filter accommodating part 34 in which a portion of the upper surface of the sensor base 30 corresponding to the circumference of the through hole 31a is concave and the filter 40 is disposed.

The filter accommodating part 34 may be provided concavely on a part of the upper surface of the sensor base 30. The filter accommodating part 34 may be formed around the through hole 31a. At least a part of the filter 40 may be accommodated in the filter accommodating part 34. The filter accommodating part 34 may have a shape corresponding to that of the filter 40.

The sensor base 30 may include a first concave portion 35 and a second concave portion 36. The first concave portion 35 may be provided so that a side surface of the sensor base 30 is concave. The first concave portion 35 may accommodate a terminal 733 of the substrate 730 of the lens driving device 10. That is, the terminal 733 of the substrate 730 of the lens driving device 10 may be disposed on the first concave portion 35. The second concave portion 36 may be provided so that a side surface of the sensor base 30 is concave. The second concave portion 36 may be formed on the opposite side of the first concave portion 37. A width of the second concave portion 36 may be narrower than that of the first concave portion 37. The second concave portion 36 may include a concave surface and an inclined surface connecting the concave surface and the side surface of the sensor base 30 at an angle.

The sensor base 30 may include a third concave portion 37. The third concave portion 37 may be provided concavely on a part of the lower surface of the sensor base 30. A space may be provided between the body part 31 of the sensor base 30 and the circuit board 60 by the third concave portion 37 and the image sensor 50 may be disposed in the space.

The filter 40 may be disposed at a position corresponding to the through hole 31*a*. The filter 40 may be disposed in the filter accommodating part 34 concavely provided on a part of the upper surface of the sensor base 30. The filter 40 may block light in an infrared range from being incident on the image sensor 50. The filter 40 may be disposed between the lens module 20 and the image sensor 50. The filter 40 may be disposed on sensor base 30. As another example, the filter 40 may be disposed on the base 500 of the lens driving device 10.

The filter 40 may be formed of a film material or a glass material. The filter 40 may be formed by coating an infrared blocking coating material on a flat plate-shaped optical filter such as a cover glass for protecting an imaging surface or a cover glass. For example, the filter 40 may be an infrared absorption filter that absorbs infrared rays. As another example, the filter 40 may be an infrared reflection filter that reflects infrared rays.

The image sensor 50 may be disposed on the circuit board 60. The image sensor 50 may be disposed on an upper surface of the circuit board 60. The image sensor 50 may be electrically connected to the circuit board 60. For example, the image sensor 50 may be coupled to the circuit board 60 by surface mounting technology (SMT). As another example, the image sensor 50 may be coupled to the circuit board 60 using flip chip technology. The image sensor 50 may be disposed such that an optical axis coincides with the lens module 20. That is, the optical axis of the image sensor 50 and the optical axis of the lens module 20 may be aligned. Through this, the image sensor 50 may obtain light passing through the lens module 20. The image sensor 50 may convert light irradiated onto an effective image region of the image sensor 50 into an electrical signal. The image sensor 50 may be any one of a charge coupled device (CCD), a metal oxide semi-conductor (MOS), a CPD, and a CID. However, a type of image sensor 50 is not limited thereto, and the image sensor 50 may include any configuration capable of converting incident light into an electrical signal. The image sensor 50 may be electrically connected to the circuit board 60 through a wire.

The sensor base 30 may be disposed on the upper surface of the circuit board 60.

Specifically, an adhesive member 65 may be disposed on the upper surface of the circuit board 60. And, the sensor base 30 may be disposed on the adhesive member 65.

The circuit board 60 may be coupled to the lens driving device 10. An image sensor 50 may be disposed on the circuit board 60. The circuit board 60 may be electrically connected to the image sensor 50. A sensor base 30 may be disposed between the circuit board 60 and the lens driving device 10. In this case, the image sensor 50 may be accommodated inside the sensor base 30. Through this structure, light passing through the lens module 20 coupled to the lens driving device 10 may be irradiated to the image sensor 50 disposed on the circuit board 60. The circuit board 60 may supply power (current) to the lens driving device 10. Meanwhile, a controller for controlling the lens driving device 10 may be disposed on the circuit board 60. The circuit board 60 may include an FPCB 61.

The circuit board 60 may include a rigid PCB on which the image sensor 50 is disposed and a flexible PCB (FPCB) connecting the connector 70 and the rigid PCB. The connector 70 may be used to electrically connect the camera module 3 to an external component.

An adhesive 80 may be disposed between the sensor base 30 and the lens driving device 10. The adhesive 80 may be disposed on the lower surface of the lens driving device 10 and the upper surface of the sensor base 30. The adhesive 80 may be disposed in the second concaved recess 33 of the sensor base 30. The adhesive 80 may be applied to the second concaved recess 33 of the sensor base 30. The adhesive 80 may be an epoxy.

A protective member 80 may be applied to the terminal 733 of the substrate 730 and the circuit board 60. The protective member 80 may prevent the terminal 733 of the substrate 730 from being exposed to the outside. The protective member 80 may be made of epoxy.

An adhesive member 65 may be disposed on the upper surface of the circuit board 60. The adhesive member 65 may be disposed on the lower surface of the sensor base 30. The adhesive member 65 may be disposed on the lower surface of the support part 32 constituting the sensor base 30. The adhesive member 65 may have a width equal to or greater than that of the lower surface of the sensor base 30. The adhesive member 65 may have a shape corresponding to the lower surface of the sensor base 30. The adhesive member 65 may be disposed on an edge region of the upper surface of the circuit board 60 in a closed loop shape. The adhesive member 65 may be disposed surrounding the image sensor 50 disposed on the circuit board 60.

The adhesive member 65 may have an opening 65*a* exposing the solder ball 62 disposed on the upper surface of the circuit board 60. The opening 65*a* may have a shape corresponding to the solder ball 62. The opening 65*a* may have a size corresponding to that of the solder ball 62. However, the embodiment is not limited thereto, and the opening 65*a* may have a larger size than the solder ball 62.

Accordingly, the solder ball 62 may protrude from the upper surface of the circuit board 60 through the opening 65*a* of the adhesive member 65. The opening 65*a* may have a closed loop shape. Accordingly, the adhesive member 65 may be disposed surrounding the outside of the solder ball 62.

The sensor base 30 may be fitted into the solder ball 62. For example, the solder ball 62 may be fitted into first concaved recesses 32*a* and 32*b* provided on the lower surface of the support part 32 of the sensor base 30. In this case, the solder ball 62 may be melted while being fitted into the first concaved recesses 32*a* and 32*b* of the sensor base 30. Accordingly, an attachment position of the sensor base 30 can be guided as the solder balls 62 are fitted into the first concaved recesses 32*a* and 32*b*, and it may be fixed on the circuit board 60 by melting the solder ball 62. In addition, the sensor base 30 may be fixed by being pressed by a pressing jig in a state of being disposed on the adhesive member 65.

According to this embodiment, when attaching the sensor base 30 to the circuit board, even if a pressing jig is used, a positional displacement problem of the sensor base 30 can be solved by the solder ball 62, and reliability can be improved by preventing an active region of the image sensor from being covered by a black masking of the filter.

In addition, when coupling the sensor base 30, the embodiment can improve a coupling force of the sensor base 30 by being able to use the pressing jig, and accordingly, it is possible to secure a constant Bont Level Thickness (BLT) height.

In addition, the embodiment may allow the sensor base 30 to be coupled through the adhesive member 65 and the solder ball 62, and accordingly, the coupling force of the sensor base 30 may be further improved.

In addition, the embodiment surrounds a region where the sensor base 30 is to be disposed through the adhesive member 65, so that the camera module can be cleaned in a state where the sensor base 30 is coupled. Specifically, when the camera module is cleaned in a state where the adhesive member 65 is not disposed, moisture or water penetrates into the sensor base 30, causing wet defects. In contrast, the embodiment can block the penetration of the moisture or water through the adhesive member 65, thereby solving the wet defect.

Hereinafter, a sensor base according to a modified example will be described with reference to the drawings.

FIG. 9 is a perspective view of a sensor base of a camera module according to a modified example of an embodiment.

In a modified example of the embodiment, the sensor base 30 may additionally include a third concaved recess 38 compared to the embodiment.

The third concaved recess 38 may be recessed on the upper surface of the sensor base 30. The third concaved recess 38 may receive at least a part of the adhesive 80. The adhesive 80 may be applied along the third concaved recess 38. The third concaved recess 38 may be formed spaced apart from the filter accommodating part 34.

The third concaved recess 38 may be formed to be spaced apart from the second concaved recess 33. The third concaved recess 38 and the second concaved recess 33 may be alternately disposed around the filter accommodating part 34. The third concaved recess 38 may extend with a wider width than the second concaved recess 33.

The third concaved recess 38 may include a third recess and a fourth recess. The third recess and the fourth recess may be formed between the filter accommodating part 34 and the outer side surface of the sensor base 30. The third recess and the fourth recess may be spaced apart from each other. The third recess may be disposed parallel to the fourth recess on the opposite side of the fourth recess based on the filter accommodating part 34. The third recess and the fourth recess may be spaced apart from the outer side surface of the sensor base 30. Each of the third recess and the fourth recess may straightly extend along an imaginary straight line. Extension lengths of the third and fourth recesses (see C in FIG. 9) may correspond to lengths in a corresponding direction of the filter accommodating part 34 (see C in FIG. 9).

Hereinafter, the configuration of the optical device according to the present embodiment will be described with reference to the drawings.

FIG. 10 is a perspective view of an optical device according to an embodiment.

The optical device may be any one of mobile phones, mobile phones, smart phones, portable smart devices, digital cameras, laptop computers, digital broadcasting terminals, personal digital assistants (PDA), portable multimedia players (PMPs), and navigation devices. However, a type of optical device is not limited thereto, and any device for taking a video or photo may be referred to as an optical device.

The optical device may include a main body 1, a display unit 2 and a camera module 3. However, in the optical device, any one or more of the body 1, the display unit 2, and the camera module 3 may be omitted or changed.

The main body 1 may form the appearance of the optical device. For example, the main body 1 may include a rectangular parallelepiped shape. As another example, the main body 1 may be formed round at least in part. The main body 1 may accommodate the camera module 3. A display unit 2 may be disposed on one surface of the main body 1. For example, the display unit 2 and the camera module 3 may be disposed on one surface of the body 1, and the camera module 3 may be additionally disposed on the other surface of the body 1 (a surface located on an opposite side of the one surface).

The display unit 2 may be disposed on the main body 1. The display unit 2 may be disposed on one surface of the main body 1. That is, the display unit 2 may be disposed on the same surface as the camera module 3. Alternatively, the display unit 2 may be disposed on the other surface of the main body 1. The display unit 2 may be disposed on a surface of the main body 1 opposite to a surface on which the camera module 3 is disposed. The display unit 2 may output an image captured by the camera module 3.

The camera module 3 may be disposed on the main body 1. The camera module 3 may be disposed on one surface of the main body 1. At least a part of the camera module 3 may be accommodated inside the main body 1. A plurality of camera modules 3 may be provided. A plurality of camera modules 3 may be disposed on one surface of the main body 1 and the other surface of the main body 1, respectively. The camera module 3 may capture an image of a subject.

The above description is only illustrative of a technical sprit idea of the present invention, and those skilled in the art to which the present invention pertains may make various modifications and variations without departing from the essential characteristics of the present invention. Therefore, the embodiments disclosed in the present invention are not intended to limit the technical sprit of the present invention, but to explain, and scope of the technical sprit of the present invention is not limited by these embodiments. A protection scope of the present invention should be interpreted by the claims below, and all technical sprits within the equivalent range should be construed as being included in the scope of the present invention.

The invention claimed is:

1. A camera module comprising:
   a circuit board;
   an image sensor disposed on the circuit board;
   an adhesive member disposed on the circuit board to surround a side of the image sensor and including an opening;
   a protrusion disposed in the opening of the adhesive member on the circuit board; and a sensor base disposed on the adhesive member,
   wherein the sensor base includes a concave portion vertically overlapping the protrusion,
   wherein the protrusion is inserted into the concave portion of the sensor base, wherein the adhesive member has a closed loop shape surrounding an edge region of an upper surface of the circuit board apart from the side of the image sensor by a predetermined distance,
wherein a width of the opening of the adhesive member is the same as a width of the protrusion, and
wherein an outer surface of a cylindrical portion of the protrusion and an inner surface of the opening are in direct contact with each other.

2. The camera module of claim 1, wherein the protrusion includes a solder ball.

3. The camera module of claim 1, wherein the concave portion includes a concaved recess concave from a lower surface of the sensor base toward an upper surface of the sensor base.

4. The camera module of claim 1, wherein the upper surface of the circuit board includes a plurality of corner regions, and
wherein the protrusion includes:
a first protrusion disposed in a first corner region of the upper surface of the circuit board; and
a second protrusion disposed in a second corner region of the upper surface of the circuit board located in a direction diagonal to the first corner region, and
wherein the opening includes:
a first opening in which the first protrusion is disposed; and
a second opening in which the second protrusion is disposed.

5. The camera module of claim 4, wherein the concave portion includes:
a first concave portion provided in a region vertically overlapped with the first protrusion on the lower surface of the sensor base; and
a second concave portion provided in a region vertically overlapping with the second protrusion on the lower surface of the sensor base.

6. The camera module of claim 1, wherein the adhesive member is disposed surrounding the outer surface of the protrusion inserted into the opening.

7. The camera module of claim 1, wherein an upper surface of the protrusion is positioned higher than an upper surface of the adhesive member.

8. The camera module of claim 1, wherein a lower surface of the sensor base is positioned lower than an upper surface of the protrusion.

9. The camera module of claim 1, wherein the sensor base includes a body part and a support part extending downward from an outer circumference of the body part, and
wherein the concave portion is provided on a lower surface of the support part.

10. The camera module of claim 9, wherein a width of the adhesive member is greater than a width of the support part, and
wherein the adhesive member includes a first portion that vertically overlaps the support part and contacts the support part, and a second portion that extends inwardly from the first portion and vertically overlaps the body part without vertically overlapping the support part and does not contact the support part.

11. The camera module of claim 9, wherein an outer width of the adhesive member is smaller than an outer width of the circuit board, and
wherein an outer surface of the adhesive member is positioned more inward than an outer surface of the circuit board.

12. The camera module of claim 8, wherein the lower surface of the sensor base is in direct contact with an upper surface of the adhesive member.

13. An optical device comprising:
a main body, a camera module disposed on the main body and capturing an image of a subject, and a display unit disposed on the main body and outputting an image captured by the camera module,
wherein the camera module includes:
a circuit board;
an image sensor disposed on the circuit board;
an adhesive member disposed on the circuit board to surround a side of the image sensor and including an opening;
a protrusion disposed in the opening of the adhesive member on the circuit board; and
a sensor base disposed on the adhesive member,
wherein the sensor base includes a concave portion vertically overlapping the protrusion, wherein the protrusion is inserted into the concave portion of the sensor base,
wherein the adhesive member has a closed loop shape surrounding an edge region of an upper surface of the circuit board apart from the side of the image sensor by a predetermined distance,
wherein an upper surface of the protrusion is positioned higher than an upper surface of the adhesive member,
wherein a lower surface of the sensor base is in direct contact with the adhesive member while being positioned lower than the upper surface of the protrusion,
wherein a width of the opening of the adhesive member is the same as a width of the protrusion, and
wherein an outer surface of a cylindrical portion of the protrusion and an inner surface of the opening are in direct contact with each other.

14. The optical device of claim 13, wherein the protrusion includes a solder ball.

15. The optical device of claim 13, wherein the sensor base includes a body part and a support part extending downward from an outer circumference of the body part,
wherein the concave portion is provided on a lower surface of the support part,
wherein a width of the adhesive member is greater than a width of the support part, and
wherein the adhesive member includes a first portion that vertically overlaps the support part and contacts the support part, and a second portion that extends inwardly from the first portion and vertically overlaps the body part without vertically overlapping the support part and does not contact the support part.

16. The optical device of claim 13, wherein an outer width of the adhesive member is smaller than an outer width of the circuit board, and
wherein the outer surface of the adhesive member is positioned more inward than the outer surface of the circuit board.

* * * * *